United States Patent
Kim et al.

(10) Patent No.: US 7,561,581 B2
(45) Date of Patent: Jul. 14, 2009

(54) METHOD OF ALLOCATING IP ADDRESS AND DETECTING DUPLICATION OF IP ADDRESS IN AN AD-HOC NETWORK ENVIRONMENT

(75) Inventors: Min-soo Kim, Seoul (KR); Sang-su Nam, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 841 days.

(21) Appl. No.: 10/782,858

(22) Filed: Feb. 23, 2004

(65) Prior Publication Data
US 2004/0174904 A1    Sep. 9, 2004

(30) Foreign Application Priority Data
Mar. 4, 2003    (KR)    ............. 10-2003-0013531

(51) Int. Cl.
*H04L 12/28*    (2006.01)
(52) U.S. Cl. ............... 370/395.54; 370/338; 709/245
(58) Field of Classification Search ............. 370/475, 370/354, 338, 349, 395.53, 329, 395.54; 709/238–245
See application file for complete search history.

(56) References Cited
U.S. PATENT DOCUMENTS

| | | | |
|---|---|---|---|
| 6,826,611 B1 * | 11/2004 | Arndt | 709/226 |
| 6,982,982 B1 * | 1/2006 | Barker et al. | 370/395.54 |
| 2002/0075836 A1 * | 6/2002 | Uematsu | 370/338 |
| 2003/0081578 A1 * | 5/2003 | White et al. | 370/338 |
| 2004/0081122 A1 * | 4/2004 | Koodli et al. | 370/329 |
| 2004/0083306 A1 * | 4/2004 | Gloe | 709/245 |
| 2005/0174998 A1 * | 8/2005 | Vesterinen et al. | 370/354 |

FOREIGN PATENT DOCUMENTS

| | | |
|---|---|---|
| JP | 9-8828 A | 1/1997 |
| JP | 2002-190816 A | 7/2002 |

OTHER PUBLICATIONS

Sanket Nesargi, Ravi Prakash, "MANETconf:Configuration of Hosts in a Mobile ad Hoc Network", IEEE, 2002.*
Charles E. Perkins et al, IP Address Autoconfiguration for Ad Hoc Networks, Mobile Ad Hoc Networking Working Group, Internet Draft, Nov. 14, 2001.*
A. Williams, Requirements for Automatic Configuration of IP Hosts, Zero Configuration Networking, Sep. 19, 2002.*

* cited by examiner

*Primary Examiner*—Aung S Moe
*Assistant Examiner*—Habte Mered
(74) *Attorney, Agent, or Firm*—Sughrue Mion, PLLC

(57) ABSTRACT

Disclosed herein is a method of allocating an Internet Protocol (IP) address and detecting the duplication of the IP address in an ad-hoc network environment. In the method of the present invention, a terminal allocates an IP address to itself and efficiently detects and handles the duplication of the IP address in the ad-hoc network environment, thus reducing the load of an entire network and allowing the method to be used together with existing routing protocols.

9 Claims, 10 Drawing Sheets

Fig. 1

IP Allocate Request Message

| IP Allocate Request | Length |
|---|---|
| Tentative IP Address ||

Fig. 2

IP Allocate Response Message

| IP Allocate Response | Length |
|---|---|
| Advisory IP Address ||

DAD Table

| Destination IP Address | Sequence Number | Temporary ID | Flag |
|---|---|---|---|
|  |  |  |  |
|  |  |  |  |

Fig. 5

History Table

| Sequence Number | Temporary ID |
|---|---|
|  |  |
|  |  |

METHOD OF ALLOCATING IP ADDRESS AND DETECTING DUPLICATION OF IP ADDRESS IN AN AD-HOC NETWORK ENVIRONMENT

BACKGROUND OF THE INVENTION

The present invention claims foreign priority under 35 U.S.C. § 119 based on Korean Patent Application No. 10-2003-0013531, filed Mar. 4, 2003, the contents of which are incorporated herein by reference.

1. Field of the Invention

The present invention relates generally to a method of allocating an Internet Protocol (IP) address and detecting the duplication of the IP address in an ad-hoc network environment, and more particularly to a method of allocating an IP address and detecting the duplication of the IP address in an ad-hoc network environment, in which a terminal allocates an IP address to itself and efficiently detects and handles the duplication of the IP address in the ad-hoc network environment, thus reducing the load of an entire network and allowing the method to be used together with existing routing protocols.

2. Description of the Related Art

An ad-hoc network is a network that is established among wireless terminals in an environment with no infrastructure, in which there is no central server and, therefore, it is almost impossible to dynamically allocate an IP address to a wireless terminal using a Dynamic Host Configuration Protocol (DHCP) server or the like.

Accordingly, since an ad-hoc network has no central server, every terminal should have a zero configuration function of allocating its IP address to itself and allowing it to communicate with the other terminals.

When a terminal allocates an IP address to itself without a central server, it examines whether its IP address is unique throughout an ad-hoc network so as to prevent a collision of the IP address. The detection of a collision of an IP address in an ad-hoc network is considerably complicated, differently from that in a wired network. The reason for this is that since terminals move, there are complicated and unpredictable variations of network topology such as the merging of different networks with each other and the dividing of a network into a plurality of networks.

Up to now, there has been used the method, in which every terminal in an ad-hoc network has a unique Identification (ID), it is assumed that the unique ID is set to a Media Access Control (MAC) address or random number, and it is determined whether each pair of a unique ID and its corresponding IP address has a duplicate in the ad-hoc network.

In another method, it is assumed that every ad-hoc network has a unique ID for distinguishing one network from another. Such an ID may be set to a random number. The ID of the network allows the detection of the merging of two ad-hoc networks.

If it is assumed that every terminal has a unique ID, the terminal sends an IP address and a unique ID to the other terminals in the process of establishing a routing table. When the sent IP address is identical with an IP address in the routing table and the sent ID is different from that of a terminal having the same IP address in the routing table, it may be determined that two different terminals use the same IP address.

If it is assumed that every ad-hoc network has a unique ID, each terminal is allocated an IP address by existing terminals of the ad-hoc network. Accordingly, in this case, it may be appreciated that the duplication of the IP address does not occur. If two ad-hoc networks are merged with each other, the merging of the ad-hoc networks is detected through the IDs of the ad-hoc networks. Two ad-hoc networks can detect the duplication of the IP addresses of the ad-hoc networks by exchanging IP address allocation tables with each other. Duplicate IP addresses are re-allocated throughout all terminals of a merged ad-hoc network.

However, although the prior art technology assumes that unique IDs of a terminal and an ad-hoc network can be generated, it is almost impossible to generate unique IDs without a prior agreement or communications. In other words, since a MAC address may have a duplicate, it cannot be ensured that IDs are unique even though the IDs are generated based on MAC addresses. As a result, in the case where an ID has a duplicate, the prior art technology cannot detect the duplication of the IP address.

Additionally, in the conventional technology, since a broadcast is launched throughout an entire network, an excessive load is exposed on the network by the broadcast, thus overloading the network.

In brief, in the prior art technology, since the topology of an ad-hoc network is changed in an unpredictable manner, a complicated method should be used to detect the duplication of the IP address. Although various countermeasures are attempted to cope with various circumstances, the prior art technology is still weak to variations of network topology. Accordingly, the prior art technology is problematic in that it may be seriously affected by the movement of a terminal and a communications failure.

SUMMARY

Accordingly, the present invention has been made keeping in mind the above problems occurring in the prior art, and an object of the present invention is to provide a method of allocating an IP address and detecting the duplication of the IP address in an ad-hoc network environment, in which a terminal allocates an IP address to itself and efficiently detects and handles the duplication of the IP address in the ad-hoc network environment.

In order to accomplish the above object, the present invention provides a method of efficiently allocating an IP address and detecting duplication of the IP address in an ad-hoc network environment, including the steps of allocating an initial IP address to a terminal, sending and receiving Hello messages; detecting duplication of the IP address while sending and receiving the Hello messages, updating a Duplicate Address Detection (DAD) table through searches of a DAD table and a history table, and determining whether a collision of the IP address occurs using a DAD timer handler.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a diagram showing a format of an IP Allocate Request message;

FIG. 2 is a diagram showing a format of an IP Allocate Response message;

FIG. 5 is a diagram showing a structure of a history table;

DETAILED DESCRIPTION OF THE INVENTION

Figures 3, 4:
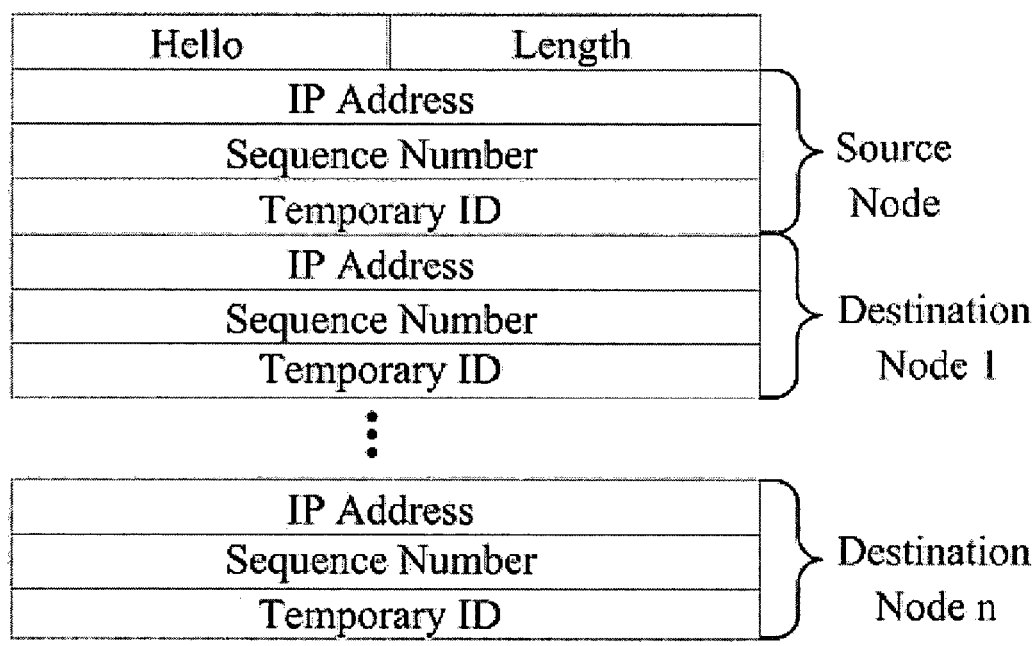
FIG. 3 is a diagram showing a format of a Hello message.
FIG. 4 is a diagram showing a structure of a DAD table.
Figure 6:
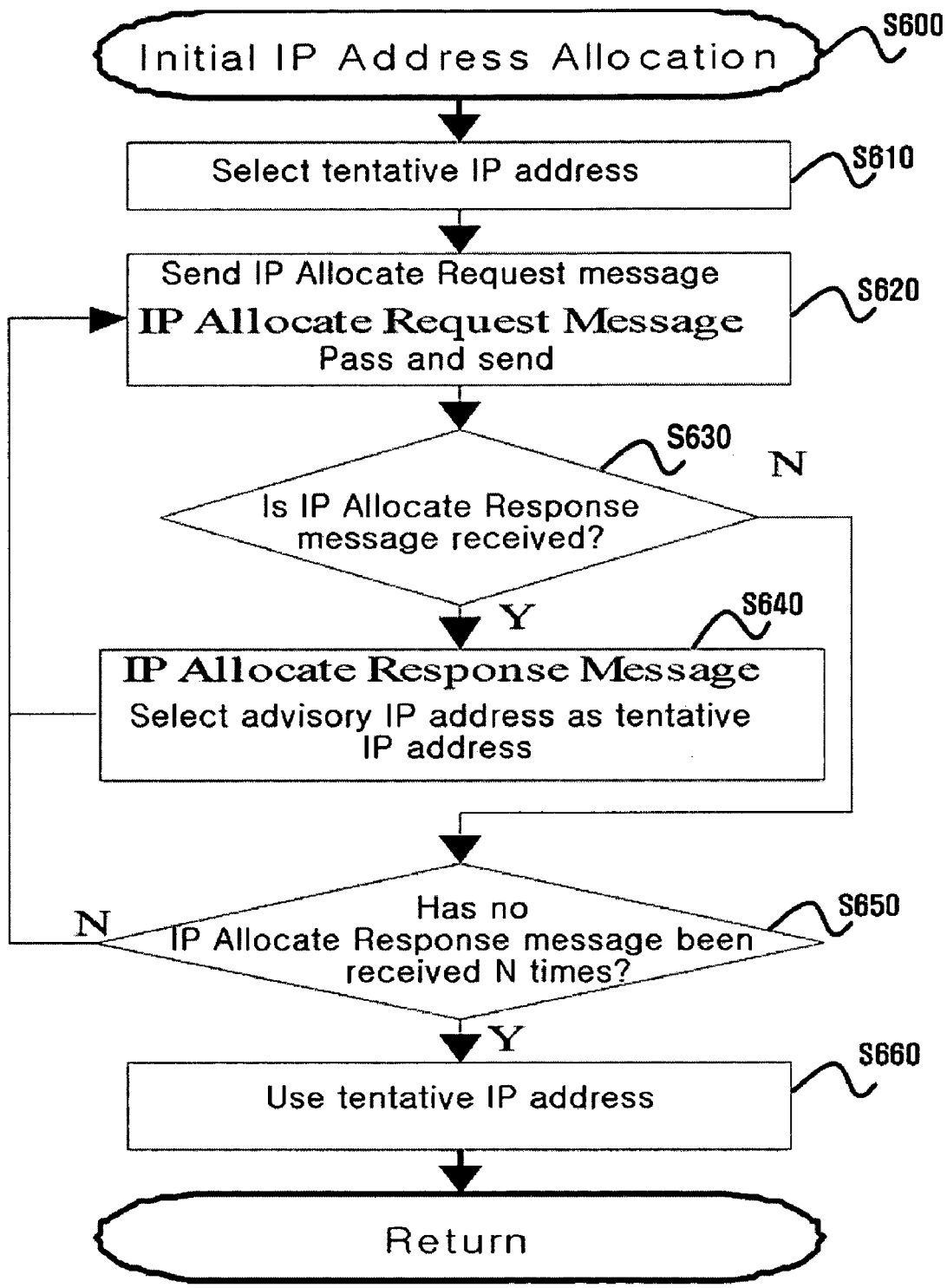
FIG. 6 is a flowchart of an initial IIP address allocation process.

Reference now should be made to the drawings, in which the same reference numerals are used throughout the different drawings to designate the same or similar components.

Hereinafter, a method of allocating an IP address and detecting the duplication of the IP address in an ad-hoc network environment is described in detail with reference to the accompanying drawings.

Every terminal in an ad-hoc network has a sequence number (hereinafter referred to as "SEQ-NUM"), a temporary ID (hereinafter referred to as "TID"), a Duplicate Address Detection (hereinafter referred to as "DAD") timer, a DAD table, and a history table.

For a clear understanding of the present invention, functions of the above terms are described below in brief.

1. The DAD timer updates SEQ_NUM and TID whenever it generates a timeout.

2. SEQ_NUM increases by "1" whenever the DAD timer generates a timeout.

3. TID is regenerated whenever the DAD timer generates a timeout (0xffff denotes an address collision).

4. The DAD table shown in FIG. 4 can be part of a routing table. Each entry of the DAD table includes an IP address of a terminal in a network, SEQ_NUM of the terminal, TID of the terminal and a flag, and is periodically updated through a one-hop broadcast message (hereinafter referred to as a "HELLO message"). In this case, the IP address is a fixed address that a terminal uses to communicate over a network, SEQ_NUM and TID are values that are used to determine whether a terminal using an IP address is unique, and the flag represents a state of an entry in the table. Additionally, when the DAD table receives new information, it stores it in an entry thereof and sets the flag to "1"; when the DAD table sends information through a Hello message, it sets the flag to "0".

5. The history table shown in FIG. 5 stores the latest SEQ_NUM and latest TID that are generated by a present terminal. In order to turn on a terminal and allocate an IP address to the terminal, an IP Allocate Request message and an IP Allocate Response message are used. A terminal that desires the allocation of an IP address sends a tentative IP address to a neighboring terminal through the IP Allocate Request message shown in FIG. 1. The neighboring terminal responds to the IP Allocate Request message through the IP Allocate Response message. The IP Allocate Request message includes a message type, a message length and a tentative IP address, while the IP Allocate Response message includes a message type, a message length and an advisory IP address.

In order to detect the duplication of an IP address after allocating the IP address, every node periodically sends a Hello message shown in FIG. 3. The Hello message includes a message type, a message length, a source node field in which information of a terminal that sends the Hello message is stored, and a destination node field in which information of a terminal that exists in a network is stored.

A method of automatically allocating an IP address and detecting the duplication of the IP address is described below with reference to FIGS. 6 to 12.

When a present terminal is turned on, the present terminal should be allocated an IP address. The allocation of the IP address is performed through an initial IP address allocation (S600) process shown in FIG. 6, which is described below in brief.

After the present terminal allocates a tentative IP address (S610) composed of a random number to itself, the present terminal asks neighboring terminals existing within a range of one hop whether the tentative IP address can be used (S620).

Thereafter, each of the neighboring terminals compares the tentative IP address with IP addresses of the DAD table using the DAD table and the IP Allocate Request message. If the tentative IP address has a duplicate, the neighboring terminal selects a certain advisory IP address that does not exist in the DAD table and sends it to the present terminal through an IP Allocate Response message. If the tentative IP address does not have a duplicate, the neighboring terminal does not respond.

If the IP Allocate Response message is sent from the neighboring terminal to the present terminal, the sending of the IP Allocate Response message means that the tentative IP address has a duplicate. Accordingly, the present terminal resends an IP Allocate Request message using the advisory IP address selected by the neighboring terminal as a new tentative IP address (S640).

The above-described steps are repeated "N" times until an IP Allocate Response message is not received from the neighboring terminals (S650). If an IP Allocate Response message has not received from the neighboring terminals "N" times, the tentative IP address is used as an IP address of the present terminal (S660).

After the initial IP address is allocated to the present terminal through the above-described process, the duplication of the IP address is detected while repeatedly sending and receiving a Hello message. A method of sending the Hello message is described with reference to FIG. 8.

The present terminal stores the IP address, SEQ_NUM and TID thereof in a source node field. Thereafter, if there is an entry in which a flag is "1" in the DAD table, the present terminal stores information of the entry in the destination node field and sends a Hello message to neighboring terminals existing within a range of one hop. A method of receiving the Hello message is illustrated in FIG. 7.

Figure 7:
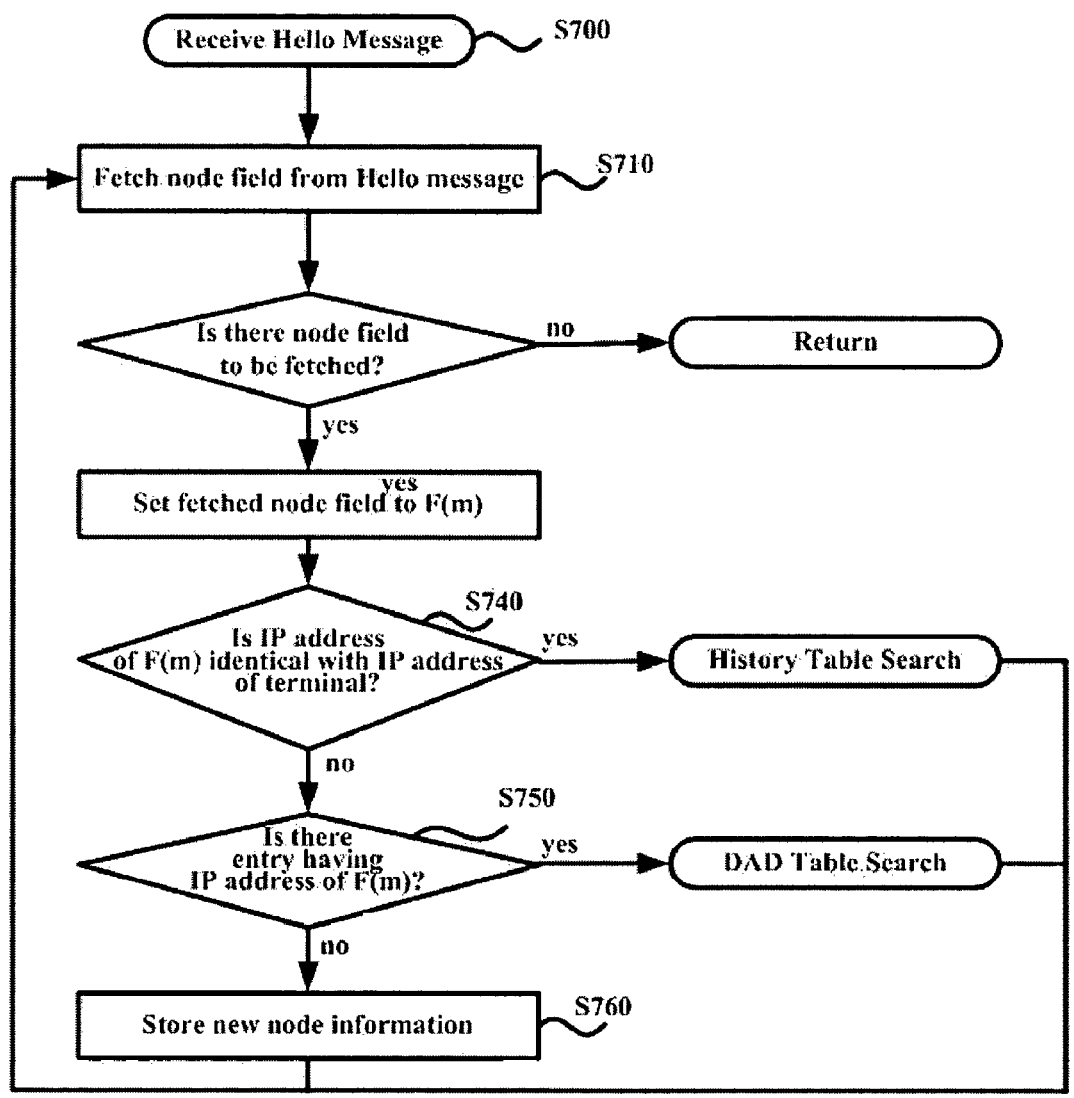
FIG. 7 is a flowchart of a Hello message receiving process.
Figure 8:
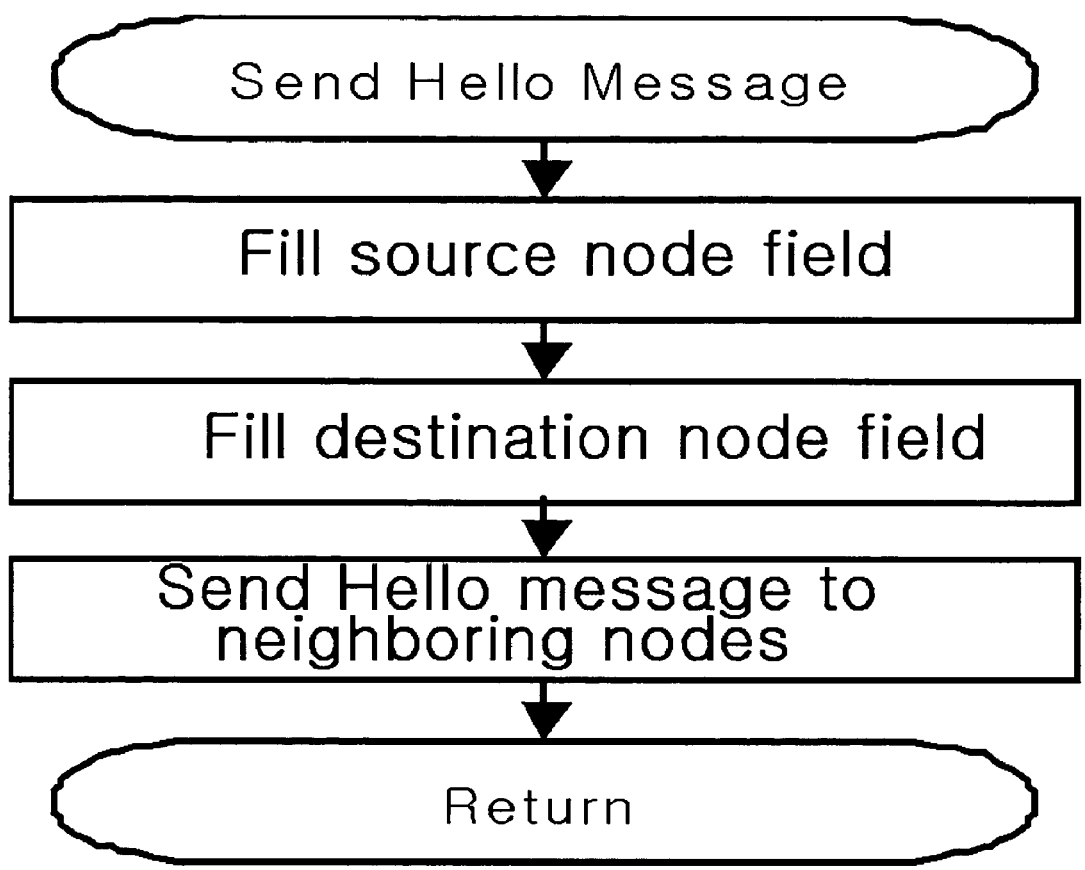
FIG. 8 is a flowchart of a Hello message sending process.

As shown in FIG. 7, when each of the neighboring terminals receives the Hello message (S700), the neighboring terminal fetches a node field F(m) (S710) from all fields including the source node field and the destination node field. If an IP address of the fetched node field F(m) is identical with the IP address of the present invention (S740), the neighboring terminal performs a history table search shown in FIG. 11. If the IP address of the fetched node field F(m) is not identical with the IP address of the present invention and an entry having the same IP address as the fetched node field F(m) is present in the DAD table (S750), the neighboring terminal performs a DAD table search. The history table search and the DAD table search are described below.

In the meantime, if a case does not correspond to one of the above-described two cases, the case implies that new node information is received. The new node information is stored in the DAD table and the flag is set to "1" (S760). This process is repeated until there is no node field to be fetched from the Hello message.

Figure 10:
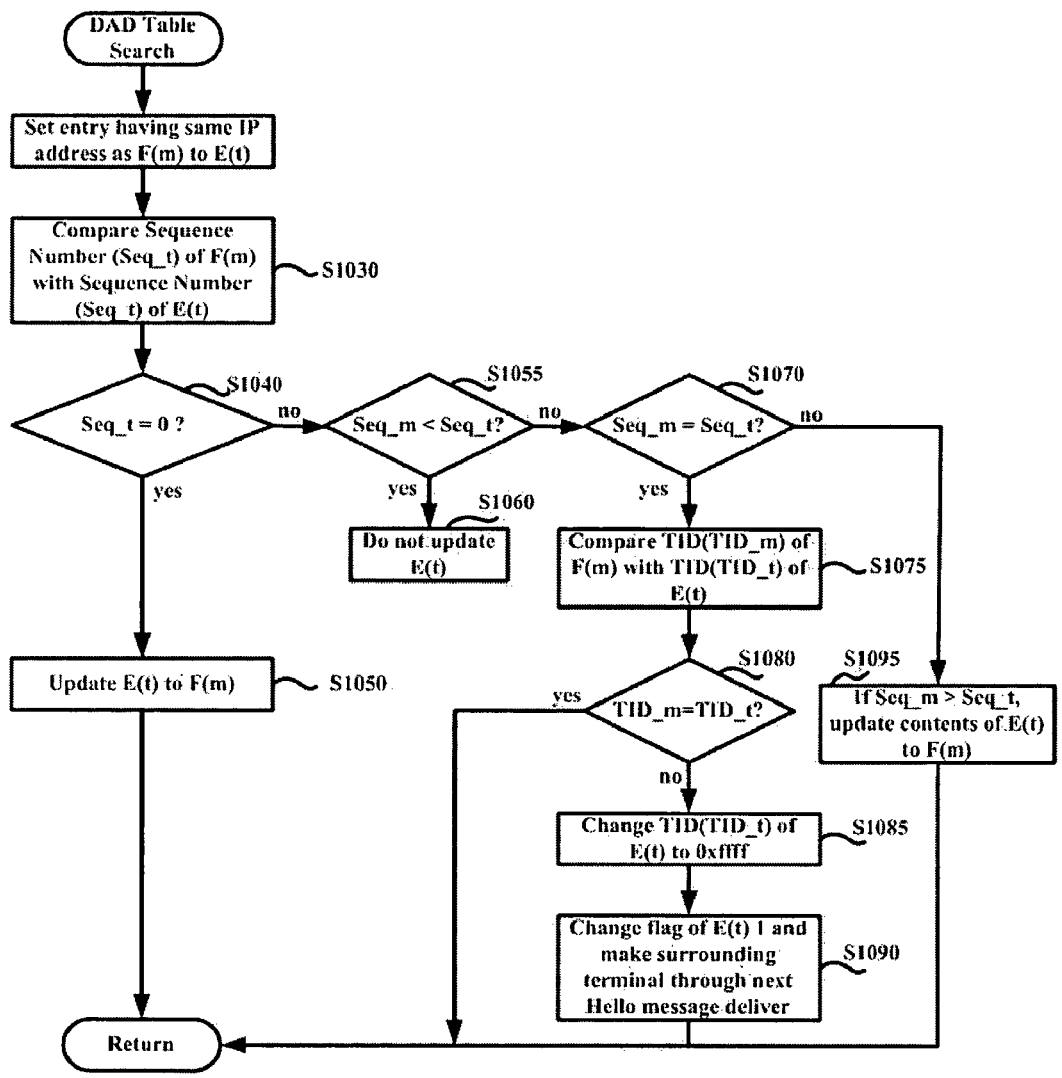
FIG. 10 is a flowchart of a DAD table search process.

The DAD table search method is described below with reference to FIG. 10.

First, SEQ_NUM of the fetched node field F(m) is compared with SEQ_NUM of an entry E(t) having the same IP address as the fetched node field F(m) (S1030). SEQ_NUM of the fetched node field F(m) is set to Seq_m and SEQ_NUM of the entry E(t) is set to Seq_t. If Seq_t is "0" (S1040), the entry E(t) is updated to the fetched node field F(m) (S1050); if Seq_m is less than Seq_t (S1055), it is determined that old information has been entered and the entry E(t) should not be updated (S1060).

Meanwhile, if Seq_m is identical with Seq_t (S1070), TID_m, that is, TIED included in the fetched node field F(m), is compared with TID_t (S1075), that is, TID included in the entry E(t). If TID_m is not identical with TID_t (S1080), the number of terminals using the same IP address is two or more. Accordingly, TID of E(t) is changed to 0xffff (S1085), the flag is changed to "1" (S1090), and the collision of the IP address is announced throughout the entire network through a next Hello message. If TID_m is identical with TID_t, it is determined that the same information has been entered and the process returns without changing the entry E(t). If Seq_m is greater than Seq_t, it is determined that new information has been entered, and the entry E(t) is updated to the fetched node field F(m) (S1095).

Figure 11:
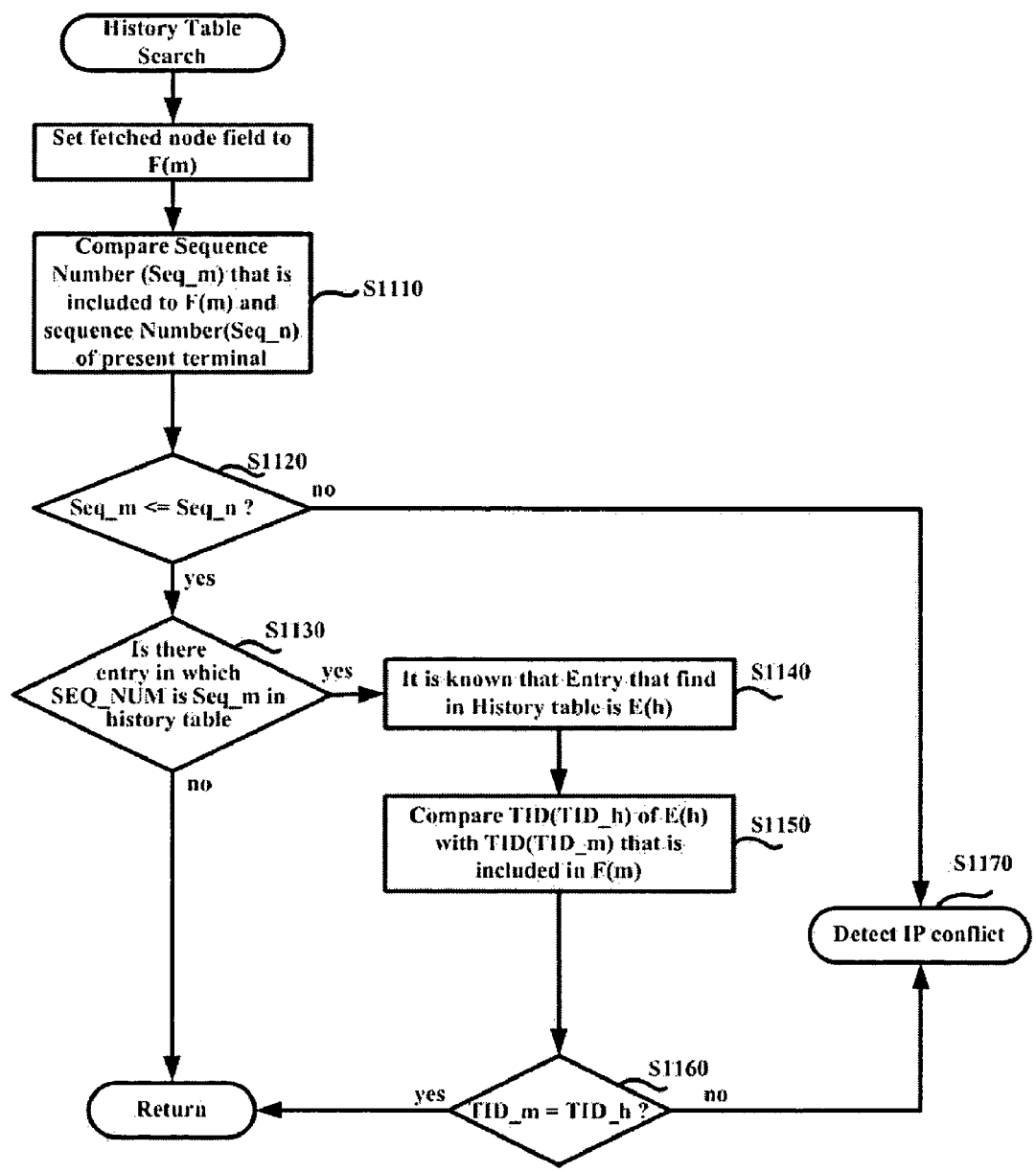
FIG. 11 is a flowchart of a history table search process.
Figure 12:
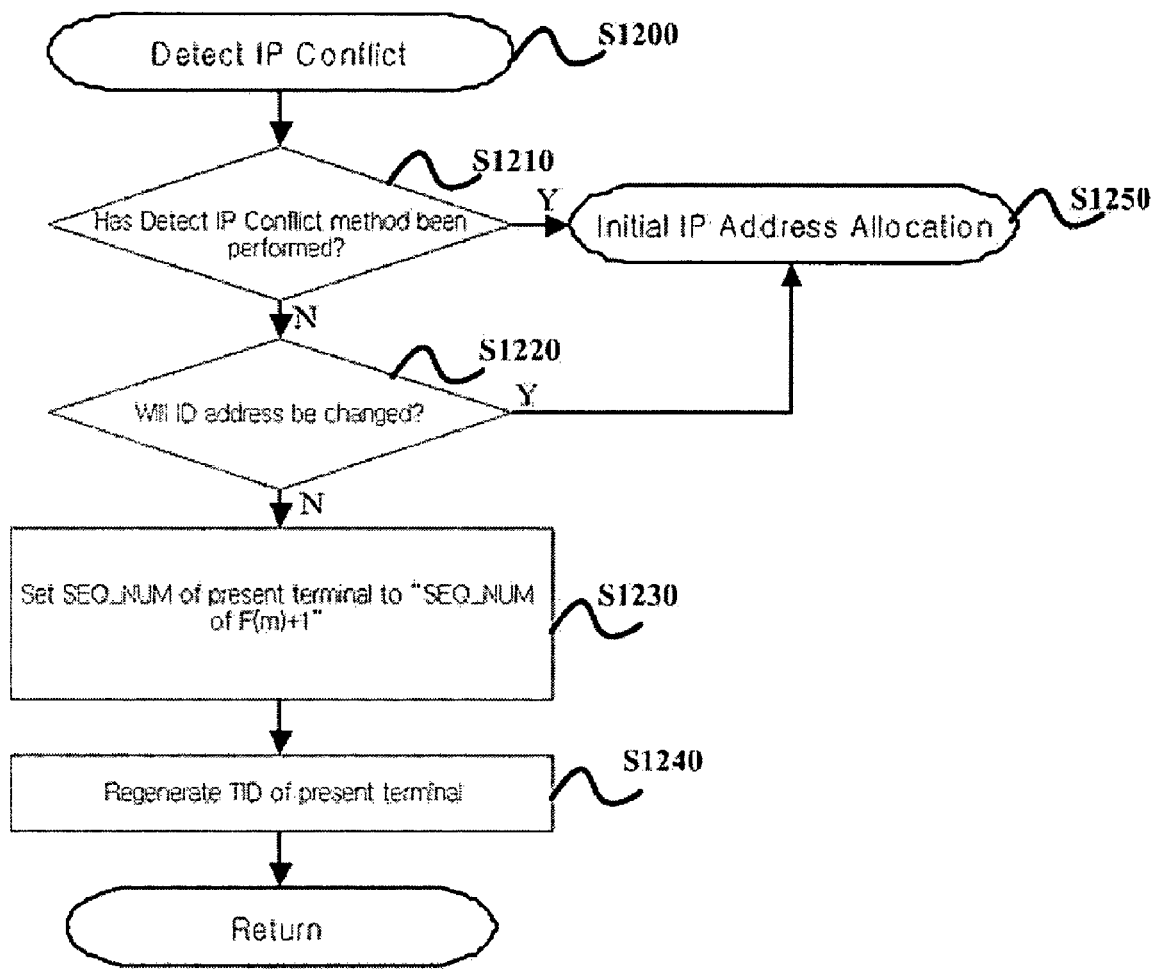
FIG. 12 is a flowchart of a Detect IP conflict process.

The history table search method is described below with reference to FIG. 11.

Seq-m, that is, SEQ-NUM included in the node field F(m) fetched from the Hello message is compared with Seq_n, that is, SEQ_NUM of the present terminal (S110). If Seq_m is less than or equal to Seq_n (S1120), it is determined whether there is an entry in which SEQ_NUM is Seq_m in the history table of the present terminal (S1130). If there is not such an entry, the process returns without any change.

Meanwhile, if there is such an entry in which SEQ_NUM is Seq_m in the history table of the present terminal, the entry is set to E(h) (S1140) and, thereafter, TID_m, that is, TID included in the fetched node field F(m), is compared with TID_h, that is, TID of E(h) (S1150). If TID_m is not equal to TID_h (S1160), a Detect IP Conflict method is carried out (S1170). The Detect IP Conflict method is described with reference to FIG. 12.

First, it is determined whether the Detect IP Conflict method has been performed with respect to the IP address that the present terminal has within a restricted period of time (for example, a period of timeout of the DAD timer×N) (S1210). If Detect IP Conflict method has been performed within the restricted time period, that means that the detection of the collision of the IP address is performed two times within the restricted time period. In this case, an IP address is re-allocated to the present terminal through the Initial IP Address Allocation process.

In the above-described case, the DAD timer handler continuously checks the generation of a timeout to determine whether the Detect IP Conflict method is performed within the restricted time period. The operation of the DAD timer handler is described in brief with reference to FIG. 9.

Figure 9:
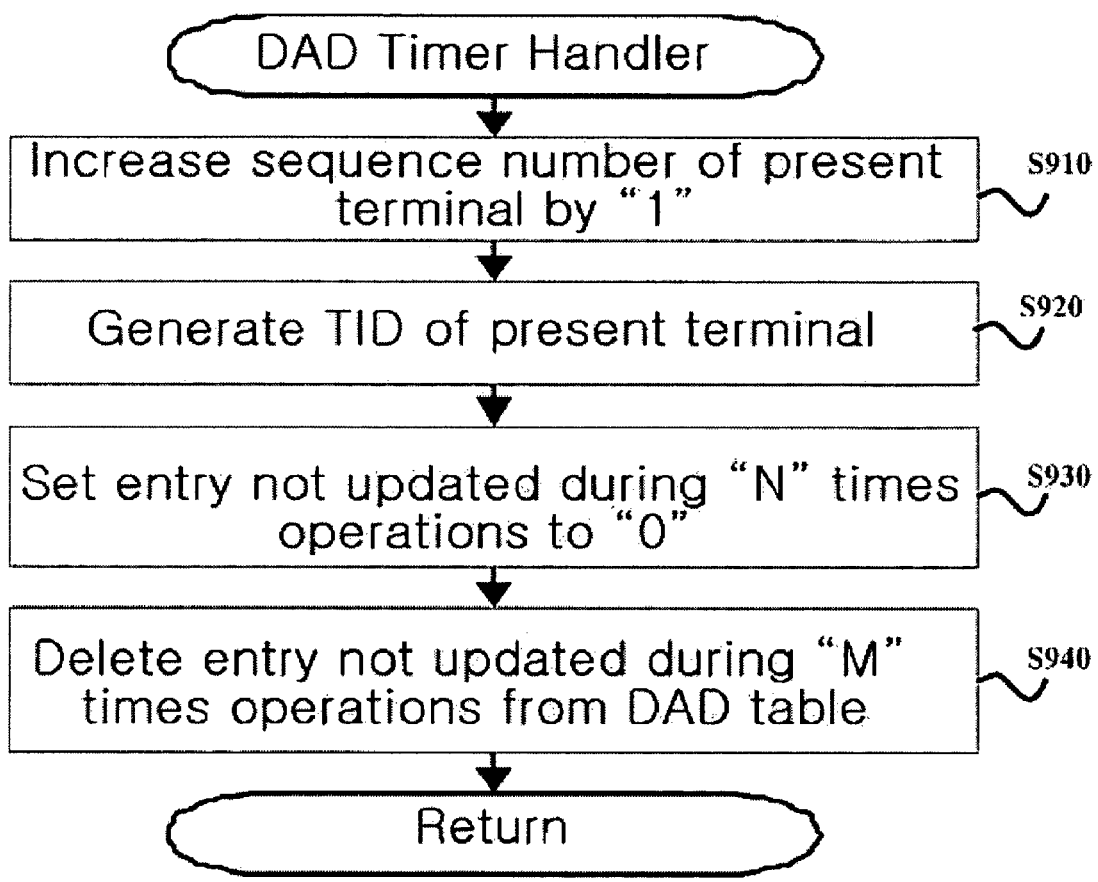
FIG. 9 is a flowchart of a DAD timer handler operation.

As shown in FIG. 9, if the timeout is generated, the DAD timer increases SEQ_NUM of the present terminal by "1" (S910) and generates TID of the present terminal (S920). If there is an entry of the DAD table that has not been updated during the "N" times operations of the DAD timer handler, SEQ_NUM of the entry is set to "0" (S930) (the effect of the setting of SEQ_NUM to "0" is illustrated in FIG. 10). An entry of the DAD table that has not been updated during "M" times operations of the DAD timer handler is deleted from the DAD table (S940) ("M" is a value sufficiently greater than "N").

In the meantime, if the Detect IP Conflict method has not been performed within the restricted time period, it should be determined whether the IP address will be changed or continuously used. If the IP address will be changed, the Initial IP Address Allocation process is performed. If the IP address will not be changed, SEQ_NUM is set to "SEQ_NUM of the fetched node field+1" and TID is regenerated so as to notify a counterpart, which uses the same IP address, of the collision of the IP address. In this case, updated information is sent to the network thorough a next Hello message.

The prior art technology imposes an excessive load to a network due to a broadcast throughout the network, while the method of the present invention reduces a load imposed on an entire network using a one-hop broadcast. Further, the prior art technology is weak to the variations of network topology such as the division of a network and the merger of networks, while the method of the present invention has stability due to its simple construction.

Additionally, the method of the present invention can prevent the case when since every terminal cannot have a unique ID, the ID is changed after an elapse of a certain time and, therefore, it becomes almost impossible to detect the duplication of an IP address due to duplicate IP address and ID.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of allocating an Internet Protocol (IP) address and detecting duplicated of the IP address in a network environment, comprising the stops of:
    allocating an initial IP address to a terminal, by the terminal;
    sending and receiving broadcast messages;
    detecting duplication of the IP address while sending and receiving the broadcast messages;
    updating a Duplicate Address Detection (DAD) table through searches of a DAD table and a history table; and
    determining whether a collision of the IP address occurs using a DAD timer handler,
    wherein the broadcast messages are one-hop broadcast messages, and each entry of the Duplicate Address Detection (DAD) table is periodically updated by the one-hop broadcast messages,
    wherein each entry of the DAD table includes an IP address of at least one of a plurality of terminals in a network, a sequence number of the at least one of the plurality of terminals, a temporary ID of the at least one of the plurality of terminals and a flag, and
    wherein the history table stores a latest sequence number and temporary ID generated by a present terminal.

2. The method according to claim 1, wherein the network environment is an ad-hoc network environment.

3. The method according to claim 1, wherein said terminal allocates said initial IP address to itself.

4. A method of allocating an Internet Protocol (IP) address and detecting duplication of the IP address in a network environment, comprising the steps;
    (a) initially allocating a tentative address to a terminal, by the terminal;
    (b) determining whether the tentative IP address can be used by the terminal;
    (c) comparing die tentative IP address with at least one other IP address;
    (d) if the tentative IP address has a duplicate, selecting an advisory IP address that does not exist;
    (e) sending the advisory IP address to the terminal;

(f) performing step (b) using the advisory IP address as the tentative IP address, wherein the at least one other IP address in a Duplicate Address Detection (DAD) table, wherein each entry of the Duplicate Address Detection (DAD) table is periodically updated by a one-hop broadcast message, wherein said each entry of the DAD table includes an IP address of at least one of a plurality of terminals in a network, a sequence number of the at least one of the plurality of terminals, a temporary of the at least one of the plurality of terminals and a flag, and wherein a history table stores a least sequence number and temporary ID generated by a present terminal.

5. The method according to claim 4, wherein said terminal allocates the tentative IP address to itself.

6. The method according to claim 4, wherein the network environment is an ad-hoc environment.

7. The method according to claim 4, wherein the network environment has no central server.

8. The method according to claim 4, wherein the advisory IP address does not exist in said DAD table.

9. The method according to claim 4, wherein a neighboring mobile terminal selects the advisory IP address.

* * * * *